(12) United States Patent
Nesin et al.

(10) Patent No.: US 10,544,897 B2
(45) Date of Patent: Jan. 28, 2020

(54) FOLDING WALL BRACKET

(71) Applicants: Liuba Nesin, Warren, MI (US); Draga Nesin, Warren, MI (US)

(72) Inventors: Liuba Nesin, Warren, MI (US); Draga Nesin, Warren, MI (US)

(73) Assignees: Liuba Nesin, Warren, MI (US); Draga Nesin, Warren, MI (US)

( * ) Notice: Subject to any disclaimer, the term of this patent is extended or adjusted under 35 U.S.C. 154(b) by 101 days.

(21) Appl. No.: 15/873,263

(22) Filed: Jan. 17, 2018

(65) Prior Publication Data

US 2019/0011076 A1 Jan. 10, 2019

Related U.S. Application Data

(60) Provisional application No. 62/530,822, filed on Jul. 10, 2017.

(51) Int. Cl.
*A47F 5/00* (2006.01)
*F16M 13/02* (2006.01)
*A47F 5/08* (2006.01)
*F16M 11/10* (2006.01)
*A47G 25/06* (2006.01)
*F16M 11/08* (2006.01)
(Continued)

(52) U.S. Cl.
CPC .............. *F16M 13/02* (2013.01); *A47F 5/08* (2013.01); *A47G 25/065* (2013.01); *B62H 3/12* (2013.01); *F16M 11/08* (2013.01); *F16M 11/10* (2013.01); *A47B 96/06* (2013.01); *A47G 1/16* (2013.01); *F16M 2200/022* (2013.01)

(58) Field of Classification Search
CPC ........... B60R 7/10; A47B 96/02; A47B 57/04; A47B 96/028; A47B 57/045; A47B 96/027; E05D 5/121; E05D 2005/122; E05D 2005/124; E05D 11/10; E05D 11/105; E05D 11/1078
USPC ....... 248/685, 690, 691, 692, 304, 308, 339, 248/341; 211/87.01, 96, 99, 100; 16/363, 374, 376, 377, 340
See application file for complete search history.

(56) References Cited

U.S. PATENT DOCUMENTS 2,071,257 A * 2/1937 Hansen ................ A47G 25/065
  224/927
2,706,049 A * 4/1955 Andrews ................... B60R 7/10
  211/104
(Continued)

FOREIGN PATENT DOCUMENTS

DE 2013 100320 2/2013
EP 2305516 4/2011
(Continued)

*Primary Examiner* — Terrell L Mckinnon
*Assistant Examiner* — Michael McDuffie
(74) *Attorney, Agent, or Firm* — Quinn IP Law (57) ABSTRACT

A folding bracket is configured to hold an object in a deployed state and store away conveniently in a stored state. The folding bracket includes a wall mount portion including a flat surface configured to lay flat against a proximate wall surface, a deployable arm connected to the wall mount portion with a hinge, and a locking portion configured to lock the deployable arm into one of the stored state and the deployed state. The deployable arm is configured to rotate relative to the wall mount portion into the deployed state and alternatively into the stored state.

13 Claims, 10 Drawing Sheets

(51) Int. Cl.
*B62H 3/12* (2006.01)
*A47B 96/06* (2006.01)
*A47G 1/16* (2006.01)

(56) References Cited

U.S. PATENT DOCUMENTS

| | | | | |
|---|---|---|---|---|
| 3,941,250 | A * | 3/1976 | Ott | A47G 25/0685 211/1.3 |
| 4,221,354 | A * | 9/1980 | Kempkers | A47G 25/065 224/927 |
| 4,856,661 | A * | 8/1989 | Guillen | A47F 5/0876 211/100 |
| 6,095,469 | A * | 8/2000 | Von Alman | B60R 7/10 224/313 |
| D473,125 | S | 4/2003 | Conroy | |
| 6,991,204 | B2 * | 1/2006 | Ay | A47G 25/065 211/100 |
| 7,118,082 | B2 * | 10/2006 | Brnjac | A47G 25/065 248/308 |
| 7,131,616 | B2 * | 11/2006 | Livingstone | A47G 25/0642 248/304 |
| 7,516,929 | B2 * | 4/2009 | Brustein | A47G 29/083 248/304 |
| 7,669,821 | B2 * | 3/2010 | Martin | B60R 7/043 224/313 |
| 7,669,822 | B2 | 3/2010 | Kluge et al. | |
| 7,681,851 | B1 * | 3/2010 | Osterholt | A47G 25/065 248/308 |
| 8,079,446 | B2 * | 12/2011 | Nemoto | B60R 7/10 185/40 H |
| 8,096,517 | B1 * | 1/2012 | Hamilton | B60N 3/005 211/106.01 |
| 8,308,125 | B2 * | 11/2012 | Losaw | F16B 45/02 248/339 |
| 8,376,300 | B2 * | 2/2013 | Nishida | B60R 7/10 248/292.12 |
| 8,550,417 | B2 * | 10/2013 | Lee | B60R 7/10 248/304 |
| 8,960,707 | B2 * | 2/2015 | Hood | B60D 1/187 248/304 |
| 9,016,642 | B1 | 4/2015 | Charles et al. | |
| 2003/0141423 | A1 * | 7/2003 | Gordon | A47G 25/065 248/304 |
| 2007/0090252 | A1 * | 4/2007 | Chou | A47G 25/065 248/304 |
| 2008/0169395 | A1 * | 7/2008 | Bullock | B60P 7/0807 248/304 |
| 2009/0057251 | A1 | 3/2009 | Kahn | |
| 2010/0213801 | A1 | 8/2010 | Ceballos-Godefroy | |
| 2011/0266403 | A1 * | 11/2011 | Terada | A47B 96/028 248/205.1 |

FOREIGN PATENT DOCUMENTS

| | | |
|---|---|---|
| EP | 3207960 | 8/2011 |
| KR | 1020150066968 | 11/2016 |
| WO | WO 2008/085422 | 7/2008 |
| WO | WO 2012/139198 | 10/2012 |

* cited by examiner

FOLDING WALL BRACKET

CROSS REFERENCE TO RELATED APPLICATIONS

This disclosure claims the benefit of U.S. Provisional Application No. 62/530,822 filed on Jul. 10, 2017, which is hereby incorporated by reference.

TECHNICAL FIELD

This disclosure is related to a folding, wall mounted bracket, in particular, to a bracket with a rotating, deployable arm.

BACKGROUND

The statements in this section merely provide background information related to the present disclosure. Accordingly, such statements are not intended to constitute an admission of prior art.

Brackets can be attached to walls for the purpose of holding or storing items on the wall. People seek to make efficient use of storage space.

Large or oddly shaped items can require large brackets that project out into the storage space. When the large brackets are not in use, the bracket arms or features can pose a dangerous obstacle for persons walking through the area.

SUMMARY

A folding bracket is configured to hold an object in a deployed state and store away conveniently in a stored state. The folding bracket includes a wall mount portion including a flat surface configured to lay flat against a proximate wall surface, a deployable arm connected to the wall mount portion with a hinge, and a locking portion configured to lock the deployable arm into one of the stored state and the deployed state. The deployable arm is configured to rotate relative to the wall mount portion into the deployed state and alternatively into the stored state.

BRIEF DESCRIPTION OF THE DRAWINGS

One or more embodiments will now be described, by way of example, with reference to the accompanying drawings, in which.

DETAILED DESCRIPTION

A folding, wall mounted bracket with a rotating, deployable arm is disclosed. The bracket includes a first wall mount portion and a second deployable arm portion. The arm can include a lockable feature, useful to secure the arm in a stored state, lock the arm in a deployed state, or lock the arm in an intermediate state.

The deployable arm portion can include a curved arm. The curve can, for example, arc toward the wall mount portion, such that an object secured upon a portion of the arm away from the wall mount portion, by the force applied by gravity, can be drawn toward the wall mount portion, thereby securing the object against the wall.

In another embodiment, the deployable arm can include raised retention features or detent features configured to provide a gripping force on items or objects placed on the deployable arm. Such retention features can be permanently attached to the deployable arm. In another embodiment, the retention features can be removable or replaceable, for example, sold to consumers for particular purposes.

The deployable arm can be configured to rotate from a deployed state into a stored state. Such rotation can enable the deployable arm to fold upward. In one exemplary embodiment, the wall mount portion can be a straight bar or rod configured vertically to be affixed to a wall stud, and the deployable arm can be a straight or curved, with a rotating joint attaching a bottom of the wall mount portion to one end of the deployable arm.

In another embodiment, the deployable arm can be configured to rotate sideways, wherein in a deployed state, the arm projects outward, for example, perpendicularly from the wall surface, and in a stored state, the deployable arm is rotated to a right or left direction and rests parallel to the wall surface.

The deployable arm can be lockable or securable in either the deployed or stored state. In one embodiment, a locking portion can include a threaded fastener with a knob handle attached, wherein tightening of the knob handle causes the threaded fastener to secure an axle attaching the deployable arm to the wall mount portion. In another embodiment, a spring loaded snap and release button mechanism can be used to lock the deployable arm in a state. In another embodiment, magnets can be used to lock the deployable arm in a state.

Figure 1:
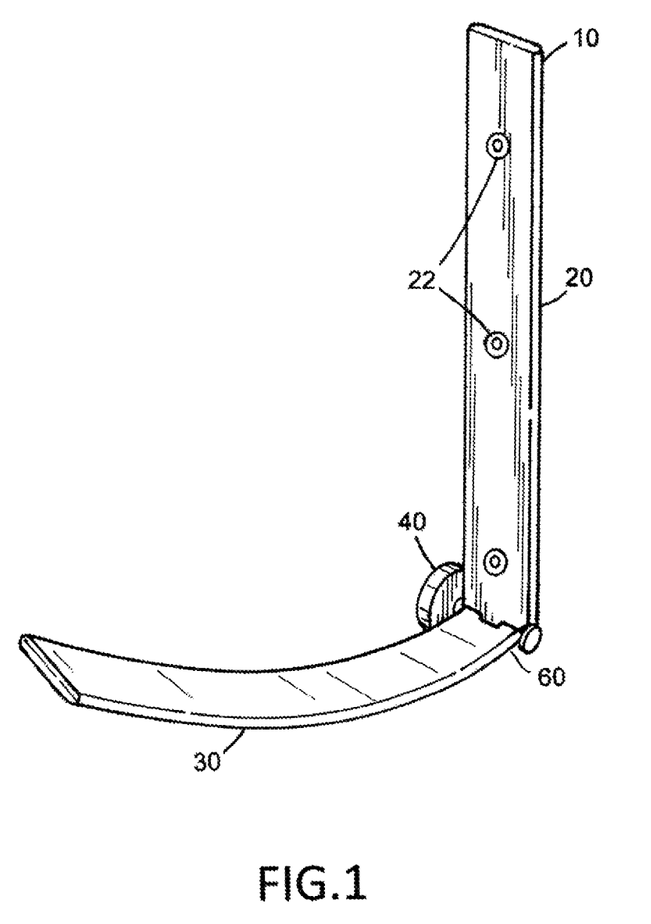
FIG. 1 illustrates an exemplary folding, wall mounted bracket, in accordance with the present disclosure.

Referring now to the drawings, wherein the showings are for the purpose of illustrating certain exemplary embodiments only and not for the purpose of limiting the same, FIG. 1 illustrates an exemplary folding, wall mounted bracket. Bracket 10 includes wall mount portion 20, deployable arm 30, and a locking portion 40. Wall mount portion 20 is joined with deployable arm 30 at hinge 60. Hinge 60 can take a number of forms known in the art, with two members being able to rotate relative to each other. Locking portion 40 can take a number of forms known in the art for stopping hinged members from turning relative to each other. Wall mount portion 20 includes three exemplary holes 22 used to fasten bracket 10 to a neighboring wall. Wall mount portion 20 is generally a flat piece configured to lay flat against a dry-walled wall surface or directly against an exposed stud such as a two by four.

Figure 2:
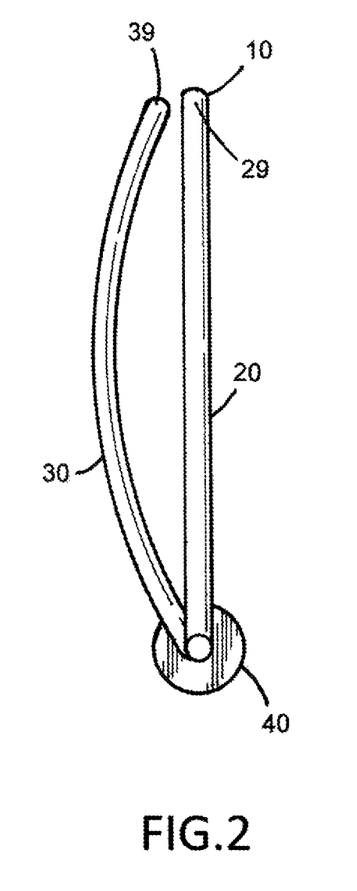
FIG. 2 illustrates the bracket of FIG. 1 in side view, with the deployable arm being in a stored state, in accordance with the present disclosure.

FIG. 2 illustrates the bracket of FIG. 1 in side view, with the deployable arm being in a stored state. Bracket 10 is illustrated, with an end 29 of wall mount portion 20 and an end 39 of deployable arm 30 being proximate to each other. In the illustrated stored state, bracket 10 is made relatively small, with the deployable arm being folded against the wall so that a surrounding space being passable and the arm is less likely to be run into by a passerby.

Figure 3:
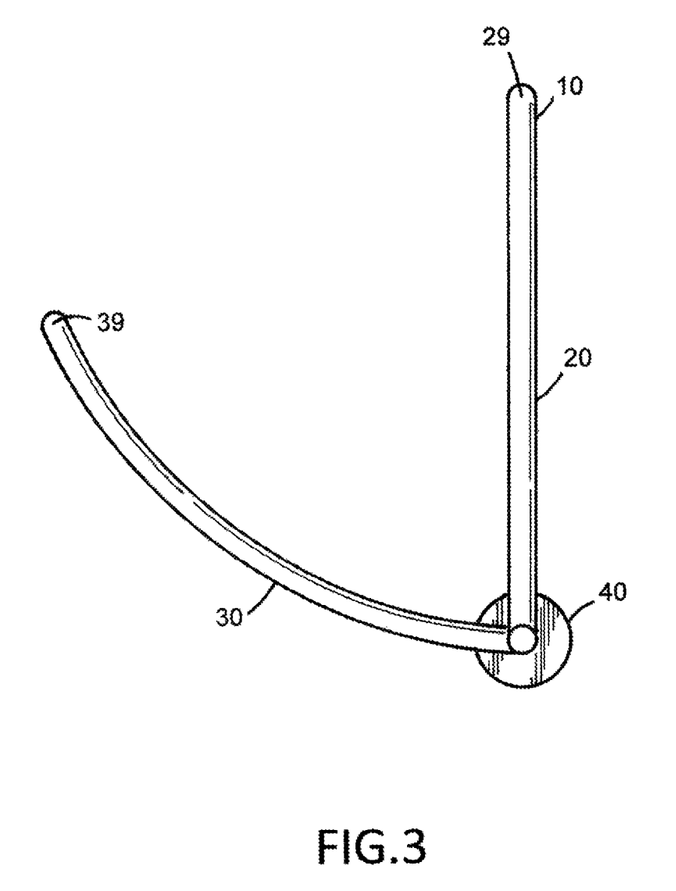
FIG. 3 illustrates the bracket of FIG. 1 in side view, with the deployable arm being in a deployed state, in accordance with the present disclosure.

FIG. 3 illustrates the bracket of FIG. 1 in side view, with the deployable arm being in a deployed state. Bracket 10 is illustrated with wall mount portion 20 and deployable arm 30 being separated relative to each other, with end 39 being projected outward away from end 29. In one embodiment, locking portion 40 can be fastened in order to keep deployable arm 30 in a desired rotation relative to wall mount 20. In another embodiment, wall mount 20 and deployable arm 30 can have features that dictate a fully open orientation of bracket 10, with deployable arm 30 being capable of bearing weight of an object being placed upon arm 30.

The curved deployable arm 30 of FIG. 3 is perpendicular to wall mount 20 at the hinge between arm 30 and wall mount 20. The deployable arm curves upward toward a top end of wall mount 20, such that any object placed upon deployable arm 30 is retained against wall mount 20 by gravity.

Figure 4:
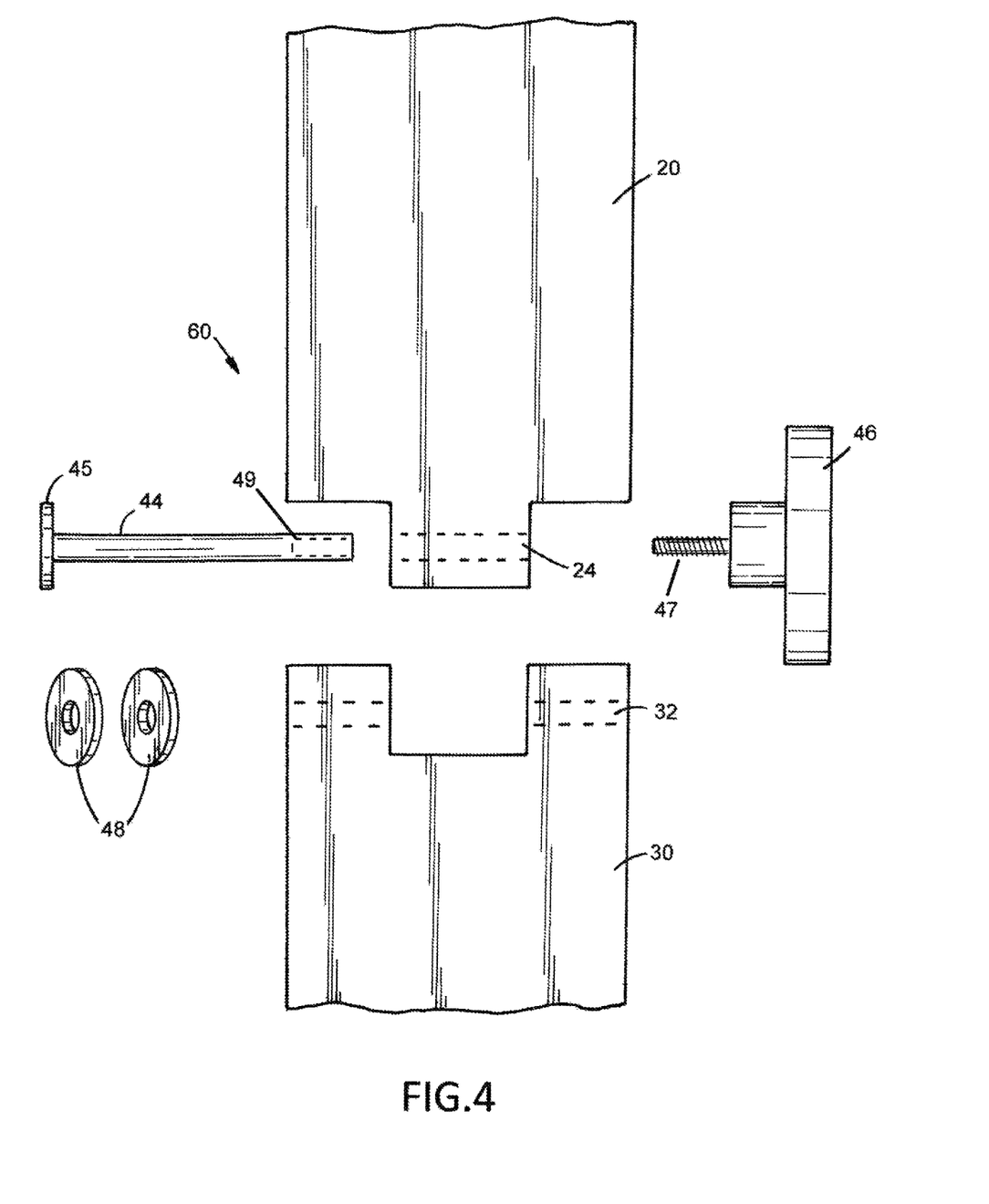
FIG. 4 illustrates in detail an exemplary hinge portion of a folding bracket, in accordance with the present disclosure.

FIG. 4 illustrates in detail an exemplary hinge portion of a folding bracket. Hinge 60 is illustrated in exemplary detail. Wall mount portion 20 is illustrated including hinge feature 24 including a through hole. Deployable arm 30 is illustrated including hinge features 32, each including a through hole. Axle 44 is illustrated, sized to be inserted into the through holes of hinge features 24 and 32. Axle 44 includes head portion 45 sized to act as a bearing surface. Knob 46 is illustrated including a male threaded portion 47 configured to engage with female threaded portion 49 of axle 44. Washers 48 are provided, one each provided to be fit to either end of axle 44 installed to the through holes of hinge features 24 and 32. As knob portion 47 is turned relative to axle 44, the distance between head portion 45 and knob 47 decreases, and a compressive force can be applied to hinge portions 24 and 32. This compressive force can be used to lock a relative rotation of wall mount 20 and deployable arm 30. It will be appreciated that the exemplary details of hinge 60 are provided as a non-limiting example, and the disclosure is not intended to be limited to the particular examples provided herein.

Figure 5:
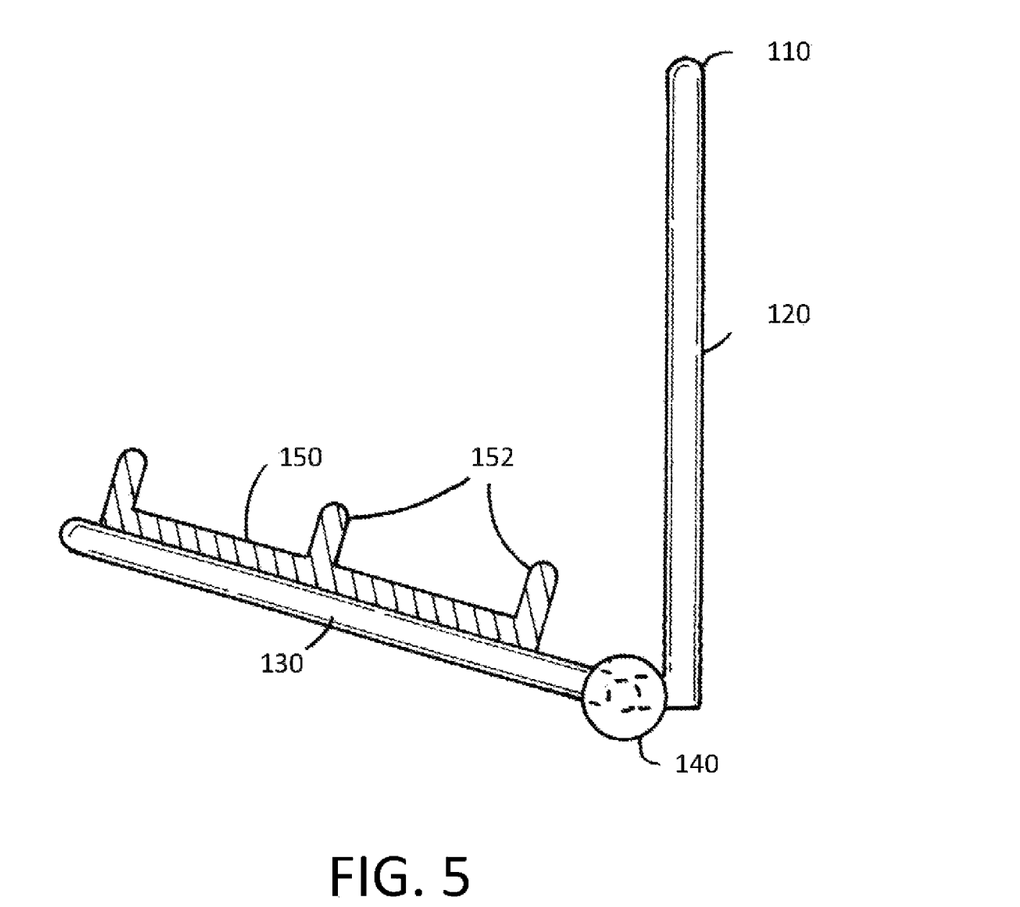
FIG. 5 illustrates an additional exemplary embodiment of a folding bracket, in accordance with the present disclosure.

FIG. 5 illustrates an additional exemplary embodiment of a folding bracket. Folding bracket 110 is illustrated including wall mount portion 120 and deployable arm 130. Deployable arm 130 is illustrated in a deployed state and including retention feature portion 150. Retention feature portion 150 can be permanently affixed to deployable arm 130. In another exemplary embodiment, retention feature portion 150 can be separable from deployable arm 130, and different retention feature portions with different details can be selectively attached to deployable arm 130. For example, one retention feature portion 150 can be configured to hold one or more bicycles. Another retention feature portion 150 can be configured to hold an extension ladder. Another retention feature portion 150 can be configured to support a plurality of garment hangers. In the exemplary retention feature portion 150 of FIG. 5, three retention feature details 152 extend upwardly from deployable arm 130. Locking portion 140 is provided enabling deployable arm 130 to be rotated upwardly relative to the illustrated position of deployable arm 130, such that retention features portion 150 can be positioned proximate to or in contact with wall mount portion 120 with deployable arm 130 in a stored state.

Figure 6:
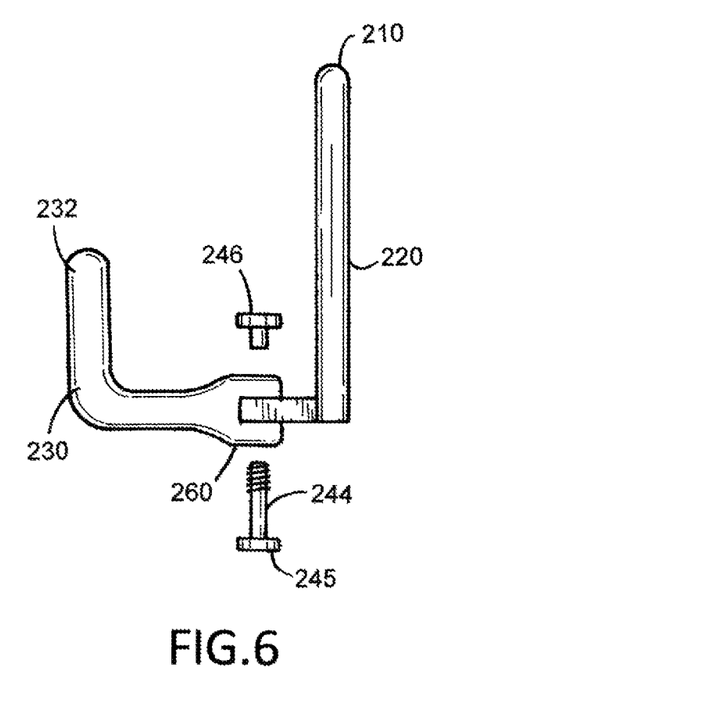
FIG. 6 illustrates an additional exemplary folding bracket in profile, with the deployable arm being configured to rotate sideways relative to a wall mount portion, in accordance with the present disclosure.

FIG. 6 illustrates an additional exemplary folding bracket in profile, with the deployable arm being configured to rotate sideways relative to a wall mount portion. Bracket 210 is illustrated, including wall mount portion 220 and deployable arm 230 connected at hinge 260. Hinge 260 is configured to permit deployable arm 230 to rotate sideways relative to wall mount portion 220, with a vertical portion 232 of deployable arm 230 remaining parallel to wall mount portion 220 throughout rotation. An exemplary axle 244 with a head portion 245 is illustrate configured to be used with knob portion 246 to form a locking feature capable of locking deployable arm 230 in a relative rotation to wall mount portion 220.

Wall mount portion 220 can be described as including a longitudinal axis that can be oriented in a vertical alignment, the hinge 260 being aligned with the longitudinal axis of wall mount portion 220, and deployable arm 230 can be rotated at various radial positions relative to the hinge, with vertical portion 232 of deployable arm 230 remaining parallel to the longitudinal axis of wall mount portion 220.

Figure 7:
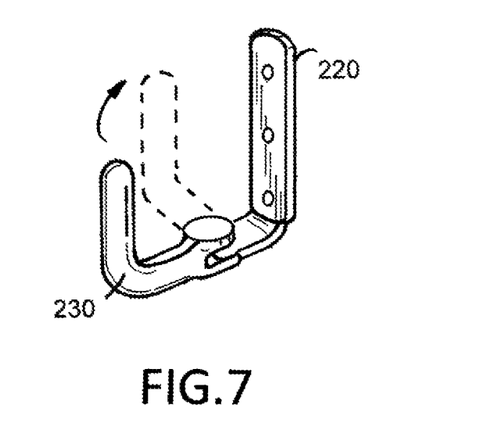
FIG. 7 illustrates the folding bracket of FIG. 6 in perspective view, in accordance with the present disclosure.

FIG. 7 illustrates the folding bracket of FIG. 6 in perspective view. Deployable arm 230 is illustrated in a deployed state, fully extended away from wall mount portion 220. Dotted lines illustrate rotation of deployable arm 230 into a stored state, rotated relatively closer to wall mount portion 220.

Figure 8:
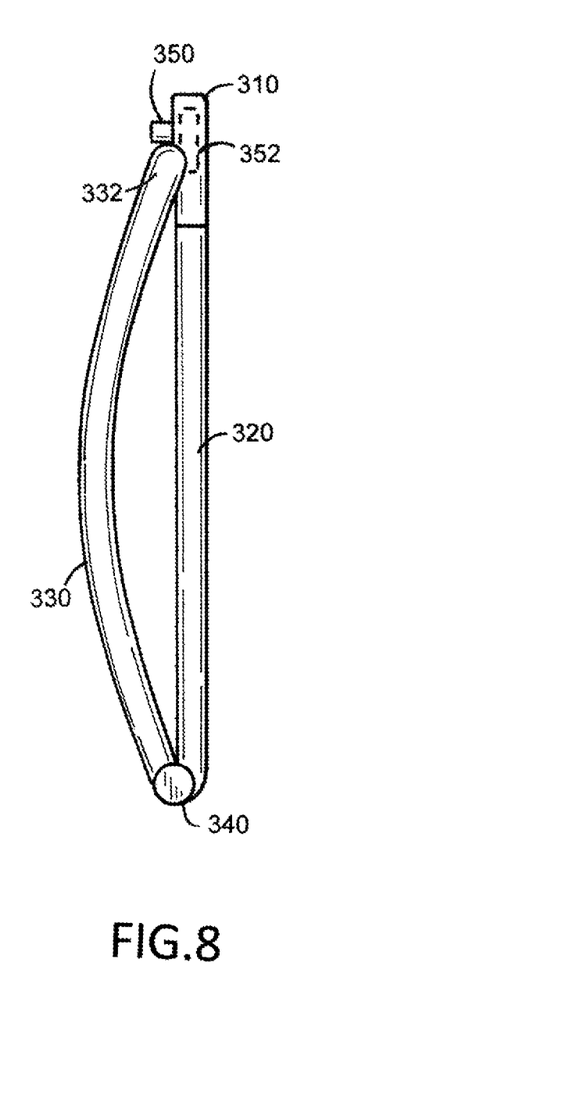
FIG. 8 illustrates an alternative configuration of the folding bracket of FIG. 1, with a latch mechanism locking the deployable arm in a stored state, in accordance with the present disclosure.

FIG. 8 illustrates an alternative exemplary configuration of the folding bracket of FIG. 1, with a latch mechanism locking the deployable arm in a stored state. Folding bracket 310 is illustrated including wall mount portion 320 and a deployable arm 330 joined at hinge 340 and illustrated in a stored state. Wall mount portion 320 includes latch mechanism 352 configured to hold an end 332 of deployable arm 330. Latch mechanism 352 can include a spring loaded tongue latch configured to catch upon a groove depression on end 332. In another embodiment, both latch mechanism 352 and end 332 can include magnets such as rare earth magnets configured to attract each other and hold the deployable arm in place. Button 350 is configured to dislodge and disconnect end 332 from latch mechanism 352 when pressed.

Figure 9:
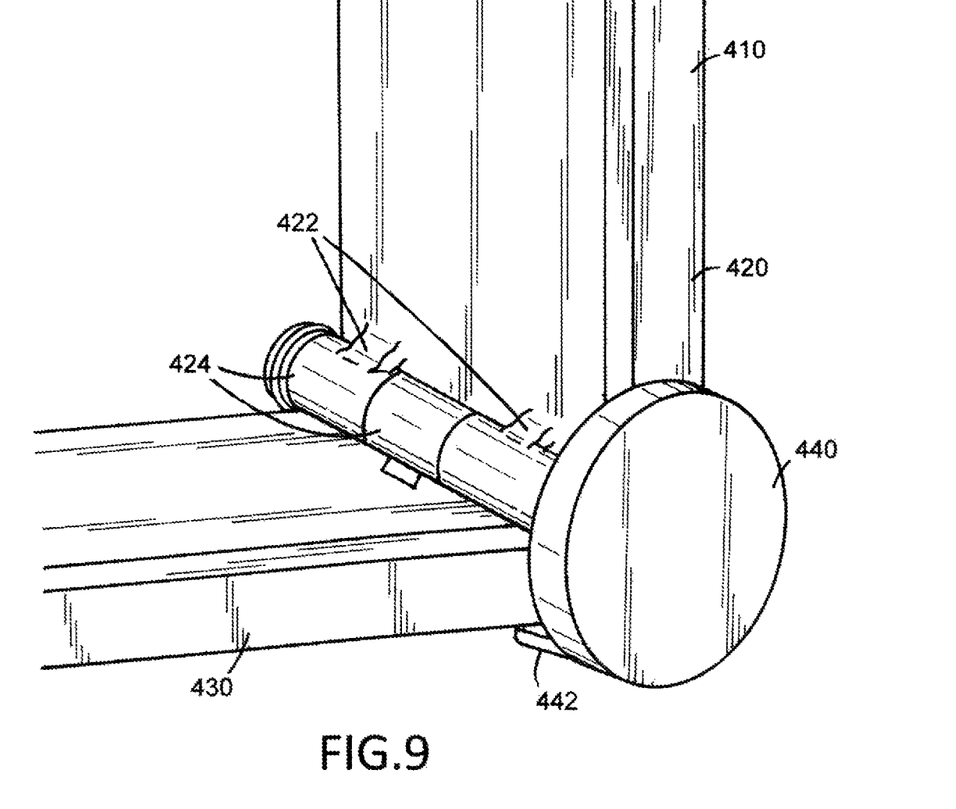
FIG. 9 illustrates an alternative embodiment of the folding bracket of FIG. 1, with a washer flange portion being used to define a deployed state position for the deployable arm, in accordance with the present disclosure.
Figure 10:
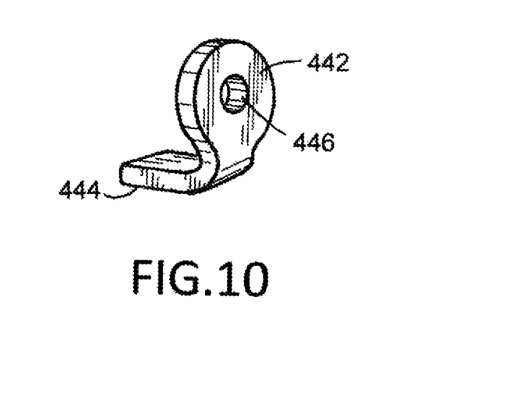
FIG. 10 illustrates the washer flange portion of FIG. 9 in more detail, in accordance with the present disclosure.

FIG. 9 illustrates an alternative exemplary embodiment of the folding bracket of FIG. 1, with a washer flange portion being used to define a deployed state position for the deployable arm. Folding bracket 410 includes a wall mount portion 420, a deployable arm 430, and a locking portion 440 comprising a knob. The knob of locking portion 440 includes an axle including a head portion. A washer flange portion 442 is included engaged to the axle of locking portion 440 and includes a flange extension under deployable arm 430, the flange extension defining how far the deployable arm 430 can rotate away from wall mount portion 420. Wall mount portion 420 is attached to deployable arm 430 through three hollow cylindrical tubes 424, each attached with weld points 422 to one of wall mount portion 420 or deployable arm 430. The axle of locking mechanism 440 is inserted within the hollow centers of each of the hollow cylindrical tubes 424. FIG. 10 illustrates the washer flange portion of FIG. 9 in more detail. Washer flange portion 442 includes a round washer body including hole 446 configured to receive an axle there within, and flange extension 444 bends ninety degrees from the plane of round washer body, the flange extension 444 being configured to connect with a wide flat face of a deployable arm and stop the arm from extending past a desired point.

Figure 11:
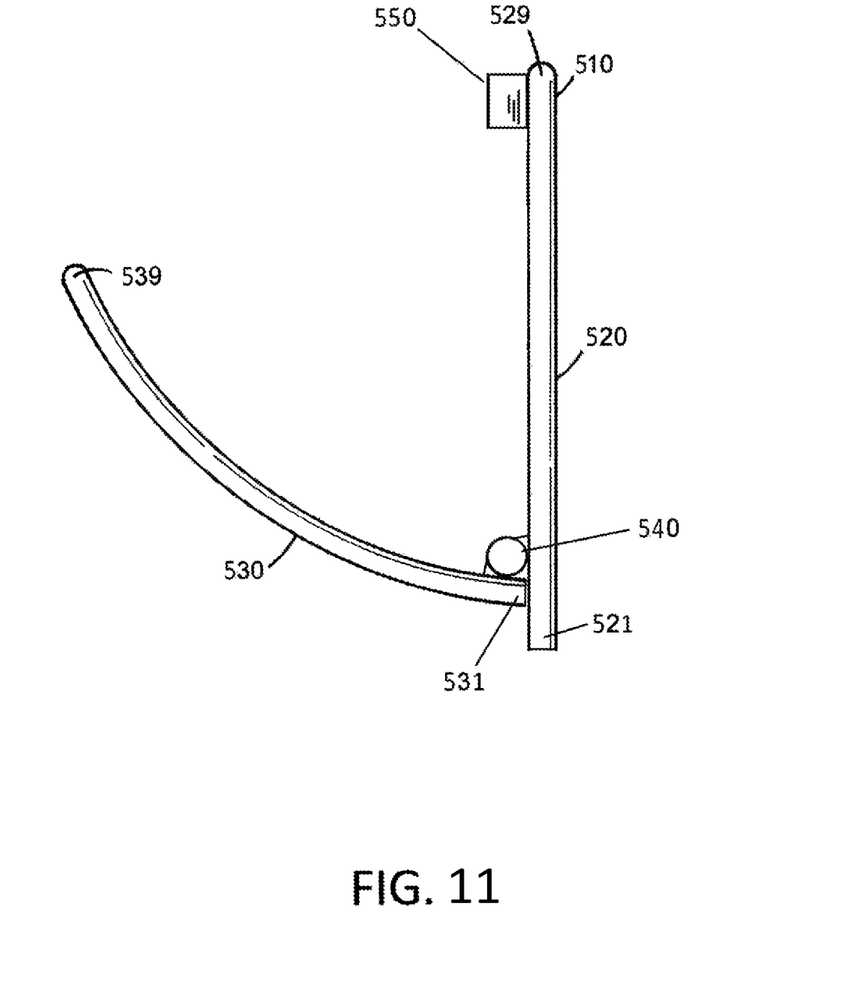
FIG. 11 illustrates an exemplary alternative embodiment of a folding bracket in a deployed state wherein a portion of a wall mount portion extends past a hinge and acts as a stop to define an orientation a deployable arm, in accordance with the present disclosure.

Embodiments of the disclosed folding bracket include a washer flange portion or a tightening locking portion associated with a hinge to set an orientation for a deployed state for a deployable arm. FIG. 11 illustrates an exemplary alternative embodiment of a folding bracket in a deployed state wherein a portion of a wall mount portion extends past a hinge and acts as a stop to define an orientation a deployable arm. Folding wall bracket 510 is illustrated including wall mount portion 520, deployable arm 530, and hinge 540. Portion 521 of wall mount portion 520 extends downwardly past hinge 540, such that a lowest portion of deployable arm 530 rests against portion 521. Because deployable arm 530 rotates around hinge 540 and because portion 521 comes into contact with the bottom of arm 530, deployable arm 530 cannot open farther than the illustrated orientation. In this way, an orientation associated with a deployed state can be defined.

A magnetic block 550 is illustrated attached to end portion 529 of wall mount portion 520. When end 539 of deployable arm 530 moves close to magnetic block 550, ferrous material or magnetic material in end 539 are attracted to magnetic block 550 such that deployable arm will be releasably locked in a stored state.

Hinge 540 can include a simple axle. In another embodiment, a coil spring within or near hinge 540 providing a torque to deployable arm 530 can be utilized, for example, applying a upward force on deployable arm 530, such that the arm is normally in an up position until a weight is applied to the arm.

Figure 12:
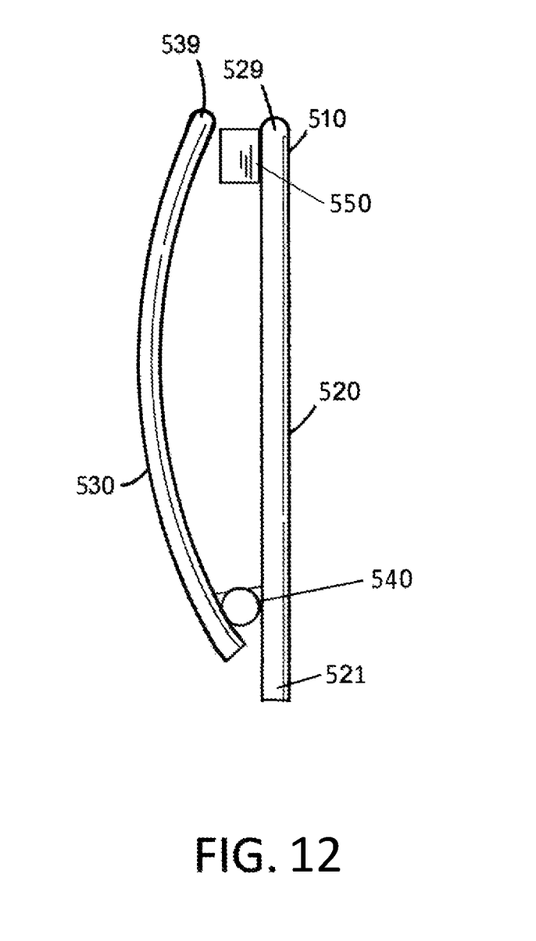
FIG. 12 illustrates the folding bracket of FIG. 11 in a stored state, in accordance with the present disclosure.

FIG. 12 illustrates the folding bracket of FIG. 11 in a stored state. Folding bracket 510 is illustrated including wall mount portion 520, deployable arm 530 and hinge 540. Wall mount portion includes end portion 529 and portion 521 located below hinge 540. Deployable arm 530 includes end 539 located proximately to magnetic block 550. Magnetic block 550 attracts and locks end 539 against magnetic block 550, such that folding bracket 510 is locked in a stored state until someone pulls end 539 away from magnetic block 550.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a folding bracket configured to hold an object in a deployed state and store away conveniently in a stored state, comprising:
    a wall mount portion comprising a flat surface configured to lay flat against a proximate wall surface;
    a deployable arm connected to the wall mount portion with a hinge, the deployable arm being configured to rotate relative to the wall mount portion into the deployed state and alternatively into the stored state; and
    a locking portion configured to lock the deployable arm into one of the stored state and the deployed state and comprising a washer flange portion comprising a washer attached to the hinge and a flange extension comprising a portion bent ninety degrees from the washer, the portion bent ninety degrees from the washer being operable to support the deployable arm and stop the deployable arm in a desired position.

2. The apparatus of claim 1, wherein the deployable arm is curved.

3. The apparatus of claim 1, wherein, when the deployable arm is in the deployed state, the deployable arm is perpendicular to the wall mount portion at the hinge and progressively curves upward toward a top end of the wall mount portion along a length of the deployable arm.

4. The apparatus of claim 1, wherein the deployable arm comprises a set of retention features along a surface that is on top of the deployable arm when the deployable arm is in the deployed state.

5. The apparatus of claim 4, wherein the retention features are affixed to the deployable arm.

6. The apparatus of claim 4, wherein the retention features are removable from the deployable arm; and
    wherein a second set of retention features can be placed upon the deployable arm.

7. The apparatus of claim 1, further comprising a button mechanism configured to hold the deployable arm against the wall mount portion when the deployable arm is in the stored state.

8. The apparatus of claim 7, wherein the button mechanism comprises a tongue and a groove latch.

9. The apparatus of claim 7, wherein the button mechanism comprises a pair of magnets.

10. The apparatus of claim 1, wherein the wall mount portion comprises a portion extending downwardly below the hinge; and
    wherein, when in the deployed state, the deployable arm contacts and is configured to rest against the portion extending downwardly below the hinge.

11. The apparatus of claim 10, wherein the locking portion comprises a magnetic block on an end of the wall mount portion distal from the portion extending downwardly below the hinge, wherein the magnetic block is configured to lock the deployable arm in the stored state.

12. An apparatus comprising a folding bracket configured to hold an object in a deployed state and store away conveniently in a stored state, comprising:
    a wall mount portion comprising a flat surface configured to lay flat against a proximate wall surface;
    an upwardly curved deployable arm connected to the wall mount portion with a hinge, the deployable arm being configured to rotate relative to the wall mount portion into the deployed state and alternatively into the stored state; and
    a locking portion configured to lock the deployable arm into one of the stored state and the deployed state, the locking portion comprising:
        an axle comprising a threaded portion;
        a knob configured to selectively tighten down upon the threaded portion; and
        a washer flange portion comprising:
            a washer attached to the hinge and with a hole coaxial with the axle; and a flange extension comprising a portion bent ninety degrees from the washer, the portion bent ninety degrees from the washer being operable to support the deployable arm and stop the deployable arm in a desired position.

13. An apparatus comprising a folding bracket configured to hold an object in a deployed state and store away conveniently in a stored state, comprising:
  a wall mount portion comprising a flat surface configured to lay flat against a proximate wall surface;
  a deployable arm connected to the wall mount portion with a hinge, the deployable arm being configured to rotate relative to the wall mount portion into the deployed state and alternatively into the stored state;
  a magnetic locking portion configured to lock the deployable arm into the stored state; and
  a locking portion configured to lock the deployable arm into one of the stored state and the deployed state, the locking portion comprising:
    an axle comprising a threaded portion;
    a knob configured to selectively tighten down upon the threaded portion; and
    a washer flange portion comprising:
      a washer attached to the hinge and with a hole coaxial with the axle; and
      a flange extension comprising a portion bent ninety degrees from the washer, the portion bent ninety degrees from the washer being operable to support the deployable arm and stop the deployable arm in a desired position;
  wherein the wall mount portion further comprises a portion extending downwardly past the hinge; and
  wherein, when in the deployed state, the deployable arm contacts and is configured to rest against the portion extending downwardly below the hinge.

* * * * *

UNITED STATES PATENT AND TRADEMARK OFFICE
CERTIFICATE OF CORRECTION

PATENT NO.         : 10,544,897 B2
APPLICATION NO.    : 15/873263
DATED              : January 28, 2020
INVENTOR(S)        : Liuba Nesin et al.

It is certified that error appears in the above-identified patent and that said Letters Patent is hereby corrected as shown below:

In the Claims

Column 6, Lines 3-11, in Claim 1, "and a locking portion configured to lock the deployable arm into one of the stored state and the deployed state and comprising a washer flange portion comprising a washer attached to the hinge and a flange extension comprising a portion bent ninety degrees from the washer, the portion bent ninety degrees from the washer being operable to support the deployable arm and stop the deployable arm in a desired position." should read --and a locking portion configured to lock the deployable arm into one of the stored state and the deployed state and, the locking portion comprising: an axle comprising a threaded portion; a knob configured to selectively tighten down upon the threaded portion, the knob and the axle providing compressive force upon the wall mount portion and the deployable arm; and a washer flange portion comprising: a washer attached to the hinge and with a hole coaxial with the axle; and a flange extension comprising a portion bent ninety degrees from the washer, the portion bent ninety degrees from the washer being operable to support the deployable arm and stop the deployable arm in a desired position.--

Signed and Sealed this
Fifth Day of May, 2020

Andrei Iancu
*Director of the United States Patent and Trademark Office*